Aug. 12, 1969  E. W. GRAHAM  3,460,263
GAUGE AND SLIDING SUPPORTS THEREFOR
Filed Feb. 28, 1968  4 Sheets-Sheet 3

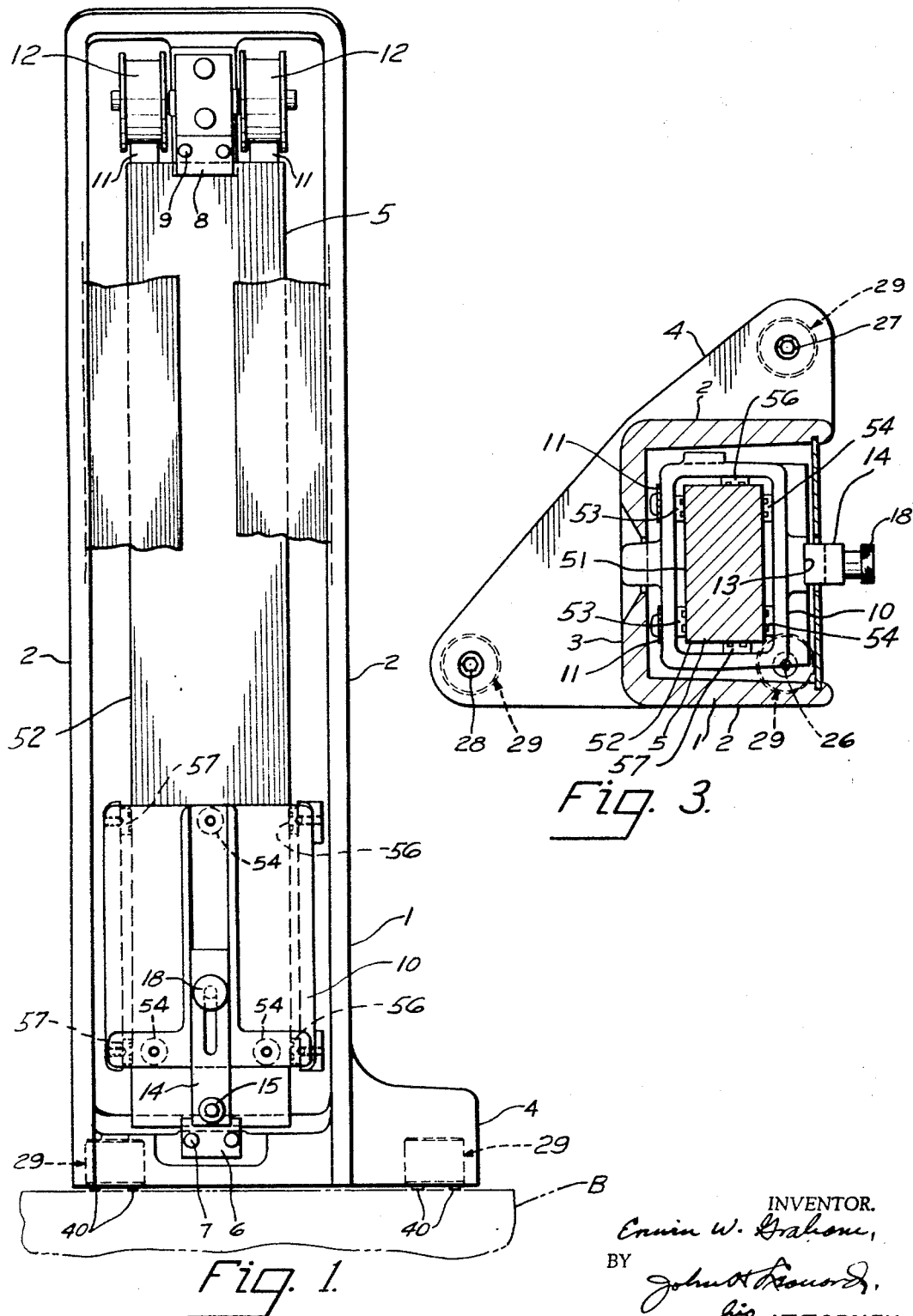

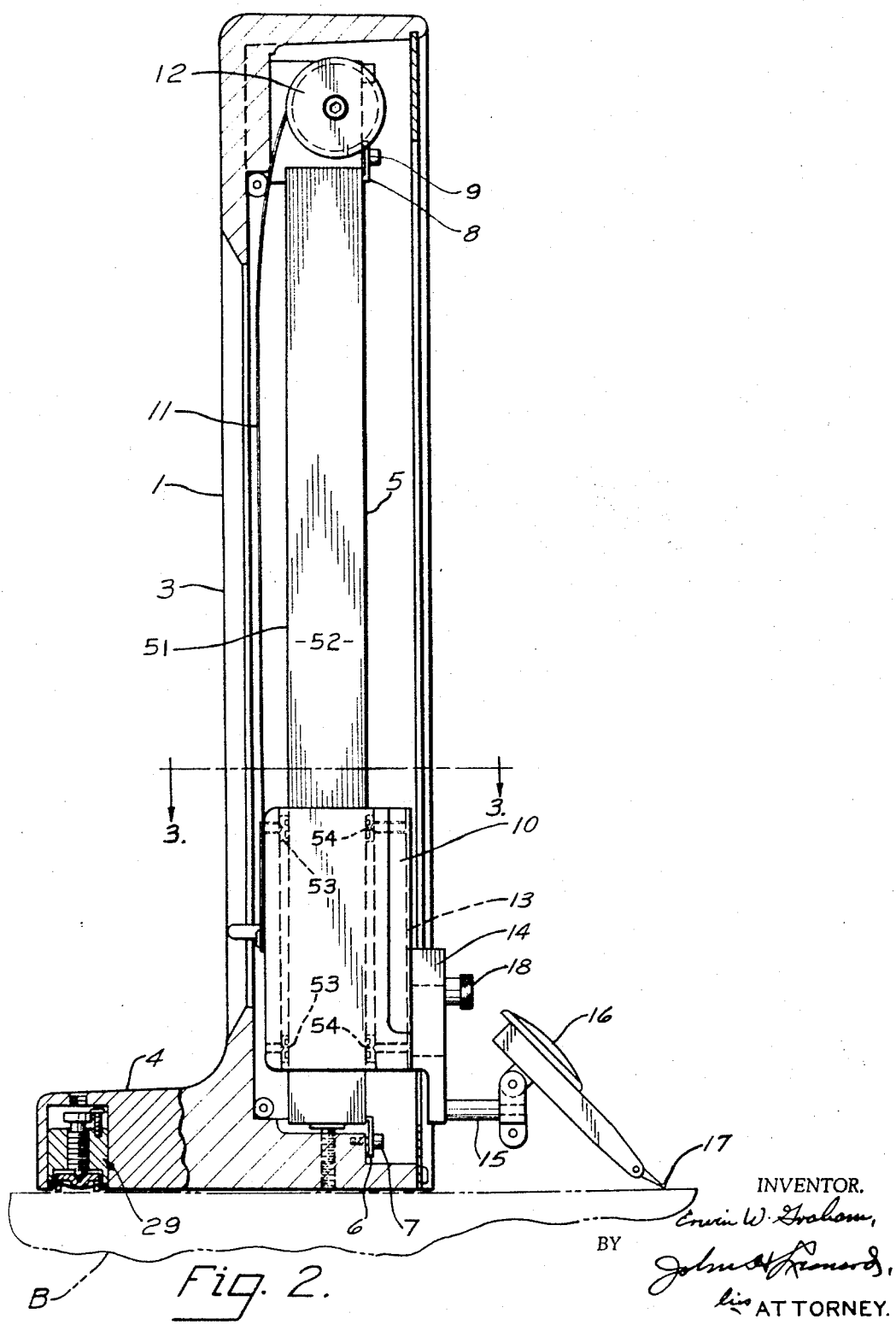

INVENTOR.
Erwin W. Graham,
BY
his ATTORNEY.

Aug. 12, 1969  E. W. GRAHAM  3,460,263
GAUGE AND SLIDING SUPPORTS THEREFOR
Filed Feb. 28, 1968  4 Sheets-Sheet 4

INVENTOR.
Erwin W. Graham,
BY John H. Leonard,
his ATTORNEY.

United States Patent Office 3,460,263
Patented Aug. 12, 1969

3,460,263
GAUGE AND SLIDING SUPPORTS THEREFOR
Erwin W. Graham, Willoughby, Ohio, assignor to The Pipe Machinery Company, Wickliffe, Ohio, a corporation of Ohio
Continuation-in-part of application Ser. No. 479,573, Aug. 13, 1965. This application Feb. 28, 1968, Ser. No. 713,562
Int. Cl. G01b 3/00
U.S. Cl. 33—174
10 Claims

ABSTRACT OF THE DISCLOSURE

A gauge member is provided with universally rockable slide pads which slidably support it on a planar surface of a second gauge member. The second member carries a gauge bar in fixed position thereon. The pads are adjustable for tilting the second member as a whole to dispose the bar at preselected angular positions relative to the gauging surface. Generally three pads are provided and are arranged so that their axes define on the planar surface a right triangle. Each pad has a plurality of coplanar slide surface areas each of which is interrupted at its boundary so as to be isolated from the others, thus assuring proper sliding and weight distribution.

---

Figure 4:
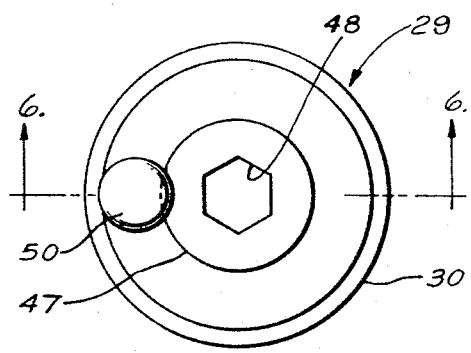

This invention relates to gauges and leveling supporting feet for leveling and slidably supporting the gauge frame on horizontal planar gauging surfaces, such as the usual horizontal top gauging face of a granite block, and is a continuation-in-part of my copending application Ser. No. 479,573, filed Aug. 13, 1965, entitled Height and Squareness Gauge.

For purposes of illustration, the principles of the present invention are shown as embodied in a squareness gauge, its use in connection with height and other type gauges being apparent from the illustrative example.

The principal object of the present invention is to provide a gauge having a rigid frame with leveling slide pad assemblies thereon which have slide feet which can slidably support the frame on a horizontal planar gauging surface by a multiplicity of spaced slide faces which in their operating positions are coplanar and can slide over said gauging surface in a manner which reduces friction to a negligible amount and assure that the weight of the gauge is applied by the slide faces of the feet to the gauging surface in a direction normal to the gauging surface and is so distributed that concentrated forces are eliminated, whereby grooving or wear of the slide faces of the feet and of the gauging surface of the block are eliminated.

In prior gauges of this type, the practice has been to mount a gauge bar on a base having nonleveling supporting feet, and to secure the bar relative to the base for adjustment to right angular relation to a horizontal gauging surface on which the base is supported.

In the present gauge, adjustment of the bar relative to the frame is eliminated and, instead, the upright gauging bar is mounted in fixed position in a rigid frame. The frame is supported by adjustable leveling slide pad assemblies by which the entire frame can be tilted to bring the guiding faces of the bar precisely into vertical position or to a right angle to the horizontal gauging surface of a supporting gauge block. The assemblies can then be locked securely in position so that the bar will always be supported with its guiding faces precisely at 90° to the gauging surface on which the frame is supported.

As is usual in such gauges, an instrument carriage is mounted on the bar for sliding therealong and carries one or more gauging devices, such as an indicator or the like which can be used to indicate squareness and to measure height.

The invention resides particularly in the leveling slide pad assemblies and the combination thereof with a frame which is adjustable by the assemblies so as to properly position the guide face or faces of the gauge bar which is held in fixed position on the frame, relative to a horizontal gauging surface, as distinguished from adjusting the bar relative to the frame, or part of the frame which carries nonadjustable or nonleveling slide feet.

Another inventive feature resides in the manner in which the carriage of the gauge is guided for sliding movement along the gauge bar.

Figure 7:
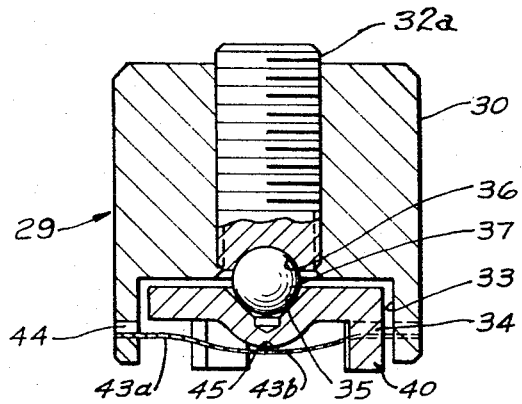
Figure 6:
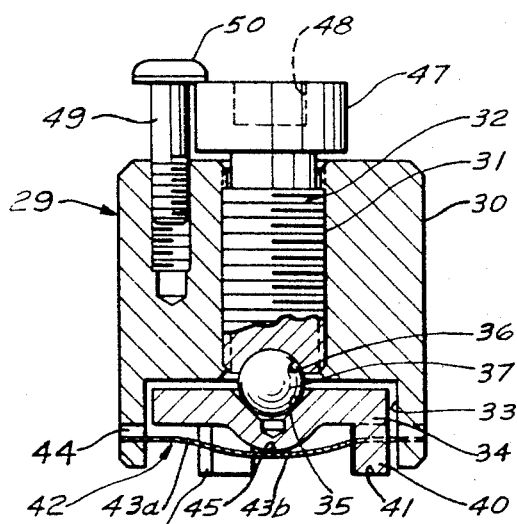
Figure 11:
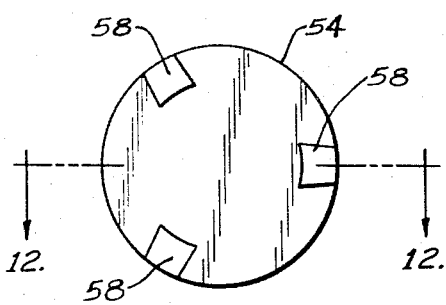
Figure 5:
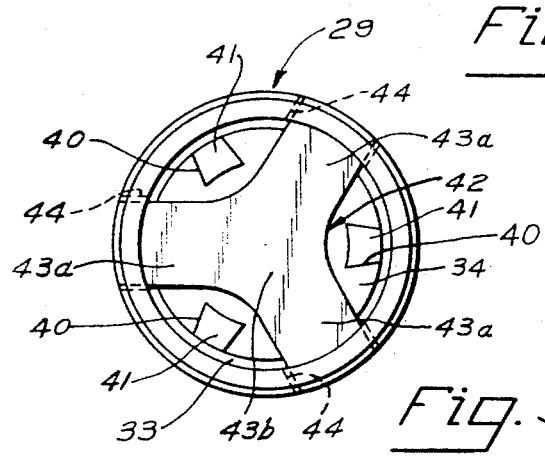
Figure 12:
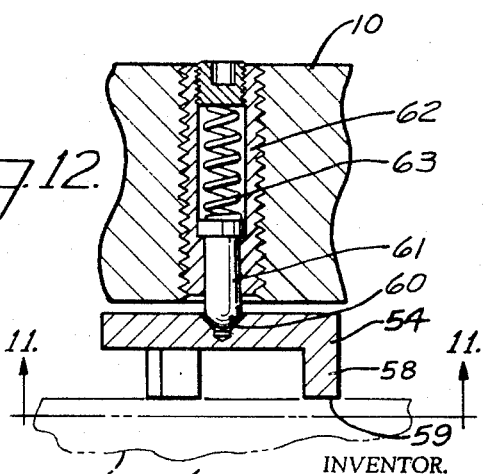
Figure 10:
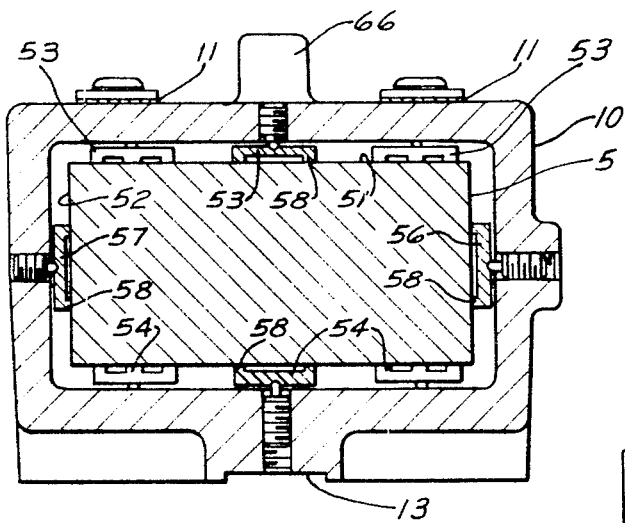
Figure 9:
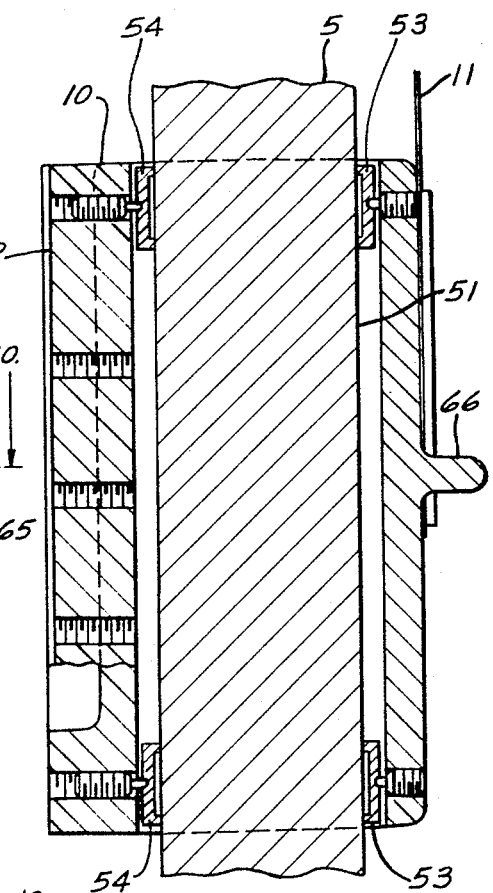
Figure 8:
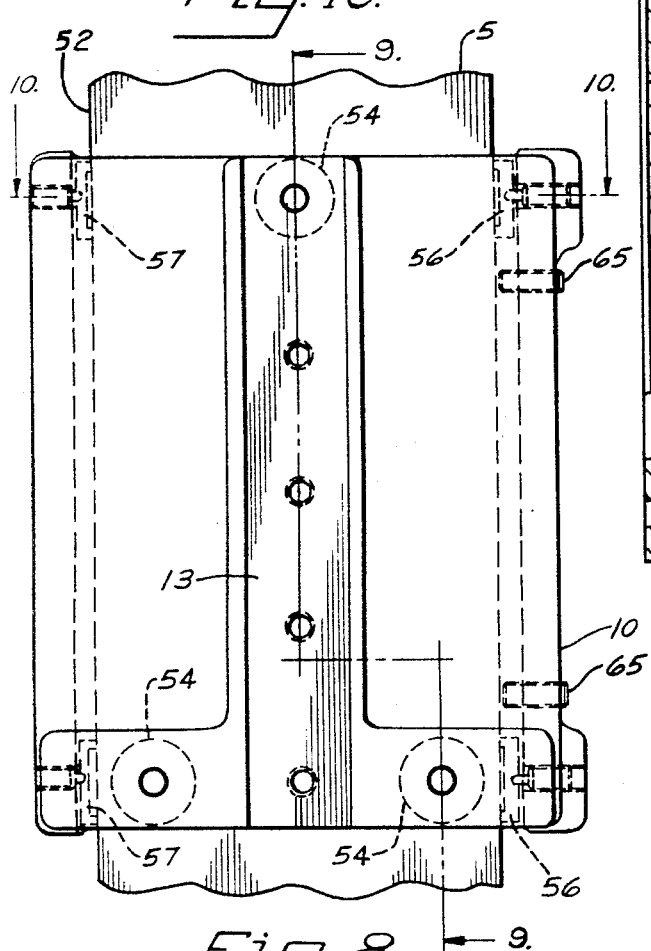

Specific objects and advantages of the invention will become apparent from the following description wherein reference is made to the drawings, in which:

FIG. 1 is a front elevation of a gauge embodying the principles of the present invention;
FIG. 2 is a left side elevation of the gauge;
FIG. 3 is a horizontal sectional view of the gauge, taken on line 3—3 of FIG. 2;
FIG. 4 is a top plan view of an adjustable slide pad assembly of the present invention;
FIG. 5 is a bottom plan view of the pad assembly of FIG. 4;
FIG. 6 is a vertical axial sectional view of the pad assembly illustrated in FIGS. 4 and 5, and is taken on line 6—6 of FIG. 4;
FIG. 7 is a vertical axial sectional view, similar to FIG. 6, but showing a nonadjustable pad assembly;
FIG. 8 is a fragmentary enlarged front elevation of a portion of the gauge showing the mounting of the indicator carriage on the gauge bar;
FIG. 9 is a vertical sectional view taken on line 9—9 of FIG. 8;
FIG. 10 is a horizontal sectional view of the structure illustrated in FIGS. 8 and 9, and is taken on line 10—10 in FIG. 8;
FIG. 11 is a fragmentary end view of an adjustable type of carriage slide pad assembly; and
FIG. 12 is a fragmentary longitudinal sectional view taken on the line 12—12 of FIG. 11.

The gauge comprises essentially a rigid upright frame, indicated generally at 1, having laterally spaced side walls 2, a rear wall 3, and an integral base 4.

Secured to the frame is an upright gauge bar 5 which preferably is of the black granite type. This bar is securely fastened at its lower end to the frame by a suitable clamp 6 and bolts 7. The upper end of the bar 5 is secured to the frame 1 by a clamp 8 and bolts 9. The specific manner of fastening the bar is not critical, but the bar should be secured to the frame immovably and so that it generally is approximately in a position normal to the planar underface of the base 4.

An instrument carriage 10 is mounted on the bar 5 for sliding therealong, as more fully described hereinafter. The carriage 10 is connected by suitable flexible bands 11 to self-winding reels 12 provided internally with counter-balance springs, respectively, not shown, which impose a constant lifting force on the carriage 10 regardless of the extent to which the bands are reeled onto or off of the reels.

Mounted in a guideway 13 on the carriage 10 for vertical sliding relative thereto is a support 14 which has an arm 15 which carries an indicator 16. The indicator 16 has the usual feeler 17, and zeroing dial, not shown, for setting it to zero when the feeler 17 is in position against a surface from which indications or measurements are to be taken. The indicator 16 is mounted on the arm 15 for tilting to different positions so that it can be used to measure the height of an object alongside the gauge or to measure the deviation of a surface from right angular relation to a horizontal planar gauging surface. A lock screw 18 is provided on the support 14 for locking it in vertically adjusted zero positions relative to the carriage 10.

The gauge bar 5 is set at the factory in fixed position relative to the frame 1.

The gauge bar 5 has a rear guide face and a lateral guide face. These faces are precisely planar throughout without twists or bends of any nature in any direction. Their planes are precisely at right angles to each other.

The carriage 10 may be moved upwardly and downwardly by hand in the usual manner, or it may be driven by a speed reduction gearing, if desired, the particular manner of driving forming no part of the present invention.

In using the gauge it is necessary that the guide faces of the bar 5 be precisely at a right angle with respect to the supporting horizontal planar face of a gauging block B on which the gauge is supported while in use. This precise setting for squareness is obtained by use of a master block which has a planar gauging face which, when the master block is placed on the horizontal gauging surface, is precisely vertical. The master block squareness gauging face is engaged by the feeler 17 on the carriage and the bar 5 is then adjusted by tilting the entire frame 1, including gauge bar 5, as a unit about two coplanar horizontal axes, one of which is normal to the rear guide face of the bar 5 and the other of which is normal to the side guide face.

For this purpose, leveling slide pad assemblies are mounted in sockets in the base 4 and are arranged to slidably engage and support the frame 1 with the bar 5 in the proper position. Preferably three sockets 26, 27, and 28, respectively, are formed in the base 4. The sockets are arranged in the base so that the sockets 26 and 27 have their vertical axes in a common vertical plane parallel to the rear guide face of the bar 5. The sockets 26 and 28 are arranged so that their axes are in a common vertical plane at right angles to the rear guide face of the bar 5, and parallel to the side guide face of the bar 5. Pad assemblies 29 are disposed in the sockets 26, 27 and 28, respectively. The assembly 29 in the socket 26 preferably is of the nonadjustable type and the assemblies in sockets 27 and 28 are adjustable for adjustment of the frame 1 to dispose the rear guide face and one side guide face of the bar 5 at a right angle to the horizontal gauge surface of the block B.

One of the adjustable assemblies 29 is illustrated in FIGS. 4 through 6, and comprises a rigid metal body 30 which is inserted in the socket 26 in coaxial relation therewith and cemented permanently in place. The body 30 has a central axial bore 31 in which is mounted an adjusting screw 32. The body has a downwardly open cavity or socket 33 at its lower end in which is disposed a rocking slide pad 34.

The pad 34 is provided with a central frustoconical cavity 35 which opens toward the lock screw 32. The screw 32 has a socket or cavity 36 coaxial with the frustoconical cavity 35. A ball 37 seats in the cavities 35 and 36 and thus provides a load transferring means which permits the rocking of the pad 34 in all directions transversely of the axis of the screw 32 and body 30 and about the center of the ball 37.

The pad 34 is of less diameter than the socket 33 and its upper face, when the ball 37 is seated, is spaced from the upper end wall of the socket 33 so that the pad 34 is free to rock universally about the center of the ball 37. The pad 34 has a plurality of feet 40 which are integral therewith and preferably at least three in number. The feet 40 are spaced equidistantly outwardly from the axis of the pad 34 and screw 32 and are spaced apart equidistantly circumferentially of the pad from each other. Each of the feet 40 has a downwardly facing planar sliding face 41. The slide faces 41 of each pad 34 are precisely coplanar and generally are so arranged that when the pad is resting on a horizontal planar surface of the gauging block B each of the faces is in face to face juxtaposition with the block face over its entire area. The free rocking of the pad 34 assures that the three or more slide faces 41 remain at all times in the proper face to face sliding relation to the horizontal upper surface of the gauging block B. To facilitate sliding, the block B preferably is impregnated with Teflon at its gauging surface.

In order to retain each pad 34 in pressure contact at all times with its associated ball 37, a multiarm leaf spring 42 is provided. The spring has arms 43a and a central portion 43b which is concave upwardly. The arms 43a are received in suitable circumferential slits 44, respectively, in the circumferential wall of the socket 33. The pad 34 has a downwardly extending convex protuberance or spherical boss 45 which is substantially coaxial with the screw 32. The bottom crest of the protuberance is engaged forcibly under resilient yielding pressure by the portion 43b of the spring 42 which, therefore, presses the pad 34 into contact with the ball 37 and the ball 37, in turn, into contact with the wall of the socket 36 in the screw 32, thus holding the pad and body 30 in assembled relation while permitting free rocking of the pad 34.

The spring 42 may be installed readily, while the screw 32 is in loosened condition, by inserting two of the arms through their respective slits 44, pressing the spring far enough to one side to allow the other arm to be dropped into the socket 33 of the body 30, and then shifting the spring laterally until the concavity at the central portion 43b of the spring is aligned with the boss 45. Thereupon the screw 32 is driven downwardly so as to assure the proper lightly stressed engagement of the spring 42 with the pad 34 and frictional binding of the arms 43a with the walls of the slits 44 in the body. Thus, at all times the pad 34 is held for relatively free rocking engagement in all directions about the center of the ball 37.

The adjusting screw 32 has an enlarged head 47 having an upwardly open socket 48 for receiving a wrench for turning the screw to adjust it axially inwardly and outwardly of the body 30. A lock screw 49 is provided and has a head 50 which overlies the margin of the upper face of the head 47 so as to engage the margin of the head 47 and lock the screw 32 in adjusted position.

As illustrated in FIG. 7, the nonadjustable pad assembly is illustrated, and is the same as that of FIGS. 4 through 6 except that a screw 32a is used instead of the screw 32. The screw 32a is moved to position to hold the pad assembly in assembled operating condition and is then permanently secured in that position.

All of the assembly bodies 30 are cemented in permanent position in their respective bores in the frame. If desired, the same ball and socket mounting can be obtained by eliminating the ball 37 and providing a downwardly convex curvilinear integral protuberance directly on the screw 32.

In order to assure that the guide faces of the bar 5 are upright for gauging squareness, the frame is disposed so that all of the sliding surfaces 41 of the feet 40 of each pad 34 are in face to face sliding engagement with the upper horizontal gauging surface of the gauging block B. In this position, the gauge is moved so that the bar 5 is disposed with its forward face in spaced face to face relation to the upright face of a master squareness gauge block. While in this position, the pad 34 of the assembly in the socket 28 is adjusted vertically by its screw 32 and the carriage 10 is run upwardly and downwardly until the feeler 17 indicates that there is no deviation between the upright rear guide face of the gauge bar 5 and the upright gauging face of the master squareness gauge block. Next the master squareness gauge block and gauge can be placed so that the block face faces the lateral guide face of the bar 5. The pad 34 of the assembly 29 in the socket 27 is then adjusted and the carriage 10 run up and down until the indication is that the lateral guide face of the bar is parallel to the upright face of the master block. This precise right angular relation of the planes through the axes of the sockets 26 and 27, on the one hand, and the axes of the sockets 26 and 28, on the other, assures that adjustment adjusting one of the pads 34 in either socket 27 or 28 does not introduce any components of change in the adjustment of the pad in the other one of the sockets.

As is well known, a gauge bar, such as the gauge bar 5, has at least two guide faces which are precisely planar and at a right angle to each other, particularly a rear guide face 51 and a side or lateral guide face 52. Generally the bar 5 is square or rectangular in horizontal cross section and has a front planar face parallel to the rear guide face 51 and another planar side face parallel to the side guide face 52.

It is desirable that the carriage 10 be held accurately in parallelism with its original starting or lowered position at all times during its movement along the bar 5. It is necessary also, particularly in the case of granite bars, to provide bearing devices on the carriage having adequate distributed bearing capacity against the rear and side guide faces of the bar 5. Rollers, ball bearings, and the like are undesirable for this purpose as they tend to concentrate the bearing forces on too small areas and hence are apt to distort, scratch, or wear grooves in the guide faces. While such wear is not so critical as to the front and non-guiding side face, even on these faces it is desirable to use sliding pads comparable to those used on the base.

As illustrated in FIGS. 8 through 10, three slide pads 53 are mounted on the carriage 10 for sliding on the rear face of the bar and have their axes so arranged that in the plane of the rear guide face 51 they define a triangular pattern and thereby provide a three point guiding slide for guiding the carriage therealong.

Three pads 54 are mounted on the carriage in position to bear on the front face of the bar 5, each one of the pads 54 being axially aligned with one of the pads 53 bearing on the rear guide face.

The pads 53 are mounted for rocking about centers, respectively, which are fixed relative to the carriage 10. The pads 54 are mounted for rocking about the centers of elements, respectively, on the carriage which are resiliently urged toward the bar 5 and thereby yieldably press the pads 54 against the front face of the bar 5.

At the side opposite the side guide face 52 of the bar 5, two spring pressed pads 56 are provided on the carriage. At the side guide face 52 of the bar 5, two pads 57 are mounted on the carriage in coaxial relation to the pads 56, and are rockable about fixed centers, respectively.

A typical carriage slide pad and mounting of the spring pressed type, such as the pads 54 and 56, is illustrated in FIGS. 11 and 12. Since the pads and mountings are the same, only the spring pressed pad 54 is described in detail. The pad 54 has feet 58, preferably three in number, spaced radially outwardly equidistantly from the axis of the pad and spaced equidistantly circumferentially of the axis from each other. The feet have planar slide faces 59 which are coplanar. The pad has a central frustoconical cavity 60 which is open at the face opposite the feet 58 and in which is seated the curvilinear convex, preferably spherical, end of a pin 61. The pin is reciprocably mounted in a bore in a screw 62 and is biased to extended position by a spring 63 within the bore of the pin. The screw is in threaded engagement with the carriage 10 and is adjusted by screwing it into the carriage a distance to provide the desired spring pressure on the pad 54 for holding it in yieldable contact with the bar 5 and for rocking universally about the spherical end of the pin 61. The other spring pressed pads and mountings are identical with the pad 54 and its mounting. The pads, such as 53 and 57, which are not spring pressed, are identical with the pad 54 and their mountings are the same except that the separate pin 61 and spring 63 are omitted and the inner end of the screw 62 has a coaxial integral pin portion with a spherical end. The pads 54 and 56 press resiliently, but firmly, against the associated front and side non-guiding faces of the bar 5 and thus cause the shoes 53 and 57 to press firmly against the rear and side guide faces 51 and 52 of the bar 5.

Thus, in the case of the rear guide face 51, not only are there three general areas of engagement of the face of the bar by three pads, but in each area there are three points of engagement of the feet of each pad. The same is true of the front face and side faces. This assures full and properly aligned bearing of the slide faces of the feet and of the pads as a whole against the guide faces so that the carriage is slidably held accurately parallel to its original position at all times, yet with adequate bearing capacity against the bar 5 in all positions of the carriage along the bar. In the form illustrated, the guiding faces of the granite bar against which the feet slide, and preferably all faces of the bar, are impregnated with Teflon which, with pads of high carbon steel and the like, appears to have a lubricating effect and to eliminate wear.

If desired, abutment stop screws 65 may be provided on the carriage and adjusted so that their inner ends clear the faces of the bar 5 from one to five thousandths of an inch so as to prevent undue rocking of the carriage by pressure applied to it transversely of the bar. This prevents accidental stressing of the springs 63 beyond a selected maximum which might change the spring characteristics.

Preferably all raising and lowering of the carriage 10 is by means of a finger hold lug 66 on the rear of the carriage.

It is found that with this structure, much greater rigidity results. A great number of the points of flexure and play present in prior structures are eliminated. Once the adjustment of the two pads is completed and the pads locked in place, no further adjustments whatever are necessary, all connections, clamps, screws and the like remain rigidly and fixedly in place.

The present gauge can readily be slid on the horizontal gauging surface of the block B, and the carriage 10 can be manipulated by hand or any conventional driving means along the bar 5. Should the gauge be dropped and misaligned, the only adjustment needed to restore it to use is the adjustment of two or the three leveling pads, as above described.

Since the invention is shown as embodied in a height gauge, certain parts are described as being "vertical" and "horizontal." These words are not used in their absolute sense, but as a convenient and brief manner of describing the relation of the parts to each other. Obviously, for some purposes the gauge may be disposed with the bar in other positions than vertical, but in such instances the interrelation of the described parts will remain the same.

Furthermore, while the principles of the invention have been drawn as incorporated in a squareness gauge, it is apparent that the present gauge can be modified by adding a micrograduated scale on the frame and a microscope on the carrier 10 so that it can be used as a height or comparator gauge. In such event, the same supports of the frame and carriage by the pads can be employed to advantage.

Having thus described my invention, I claim:

1. A gauge comprising a first gauge member having a planar gauging surface;
    a second gauge member;
    a plurality of at least three slide pads carried by the second member, each pad having an end face facing toward said planar surface; said pads being spaced apart from each other about a common axis extending normal to said surface;
    connecting means for the pads, respectively, and connecting each pad to the second member for rocking movement in all directions transversely of an individual axis extending normal to said planar surface;

each pad, at its said end face, having at least three separate individual flat coplanar slide surface areas spaced radially outwardly from its said associated axis and from the central portion of its said end face and lying in a plane offset in a direction axially of the pad from the entire remainder of said end face toward the planar surface so that when said individual slide surface areas are in sliding engagement concurrently with said planar surface said remainder of said face is spaced from said planar surface;

said pads being positioned on the second member so that the flat slide surface areas of all of the pads are in sliding engagement concurrently with said planar surface and are coplanar with respect to each other when in said engagement; and each slide surface area of each pad being interrupted about its entire periphery by a portion of said remainder of said end face which portion extends about said entire periphery and is offset axially from said slide surface area so that each slide surface area is discontinuous with respect to, and is isolated from, each of the other slide surface areas of the same pad.

2. The structure according to claim 1 wherein each central portion of each pad has a central pressure transmitting surface portion at the one of its faces opposite from the frame, and the resilient means is a leaf spring having a pressure transmitting surface portion;

one of said pressure transmitting surface portions is concave toward the other, the other pressure transmitting surface portion is convex and has a crest in resilient stressed engagement with the center of the concave pressure surface portion so as to urge the pad axially toward the frame while permitting free rocking.

3. A gauge according to claim 1 wherein the second member is a supporting frame;

a granite gauge bar is mounted on the frame and has two pairs of opposing faces extending endwise of the bar and parallel to a common axis extending endwise thereof;

the faces of one pair being angularly disposed to the faces of the other pair;

an indicator carriage;

four sets of slide pads are mounted on the carriage;

said sets bear against said faces, respectively, for guiding the carriage for sliding movement along the bar;

means yieldably urge the pads of one of said sets against one face of one pair and the pads of another of said sets against one face of the other pair; the remaining sets bear against the other faces of said pairs, respectively;

connecting means connect each pad to the carriage for rocking in all directions transversely of an individual axis extending toward the associated face of the bar; and each pad, at that one of its faces which faces toward the bar face against which the pad bears, having flat coplanar slide surface areas which are spaced outwardly from its associated axis and from the central portion of said one face and lie in a plane spaced axially of the pad from said central portion in a direction toward the associated face of the bar and are in sliding engagement therewith; and the central portion of the pad is spaced therefrom; and all slide areas of each set of pads are coplanar when the pads of the set are in sliding engagement concurrently with their associated face of the bar.

4. The structure according to claim 1 wherein the number of pads is exactly three and the number of said isolated slide surface areas on each pad is exactly three, and said three areas are spaced substantially equidistantly radially from, and circumferentially about, the individual axis of the pad.

5. A gauge comprising a frame, a granite gauge mounted thereon having two pairs of opposing faces extending endwise of the bar and parallel to a common axis extending endwise thereof;

an indicator carriage;

four sets of slide pads on the carriage;

said sets bearing against said faces, respectively;

connecting means connecting each pad to the carriage for rocking in all directions transversely of an axis extending toward the associated face of the bar;

means yieldably urging the pads of one of said sets bodily axially of the pad axes against one face of one pair of said faces and the pads of another of said sets against one face of the other pair of said faces while permitting said rocking movement;

means securing the pads of the remaining sets against bodily movement toward and away from their associated one of the other of said faces of the bar and holding them in rockable bearing engagement with their associated one of said other faces of said pairs, respectively;

that face of each pad which faces the bar having flat coplanar slide surface areas, spaced outwardly from its associated axis and from the central portion of said one of its faces, and lying in a plane spaced axially of the pad from said central portion in a direction toward the associated face of the bar so that said slide areas of each pad are in sliding engagement with the associated bar faces and the central portion of each pad is spaced from its associated bar face; and the slide areas of all pads of each set being coplanar when in their sliding engagement.

6. The structure according to claim 5 wherein said pads being positioned on the second member so that the flat slide surface areas of all of the pads of a set which are in sliding engagement concurrently with the same bar face and are coplanar with respect to each other when in said engagement; and each slide surface area of each pad being interrupted about its entire periphery by a portion of said remainder of said end face which portion extends about said entire periphery and is offset axially from said slide surface area so that each slide surface area is discontinuous with respect to, and is isolated from, each of the other slide surface areas of the same pad.

7. A gauge comprising a first gauge member having a planar gauging surface;

a second gauge member including a supporting frame;

a plurality of at least three slide pads carried by the frame;

connecting means for the pads, respectively, and connecting each pad to the frame for rocking movement in all directions transversely of an individual axis extending normal to said planar surface and with an end face exposed toward said planar surface;

each pad, at said one of its faces, having flat coplanar slide surface areas spaced outwardly from its said associated axis and from the central portion of said one of its faces and lying in a plane spaced axially of the pad from said central portion in a direction toward the planar surface so that said slide surface areas are in sliding engagement with said planar surface and the central portion is spaced from the planar surface;

the slide surface areas of all pads being coplanar when all of the pads are in said sliding engagement;

a gauge bar mounted in fixed position on the frame and having a precision planar gauging face;

the slide levelling pads being exactly three in number and being spaced apart transversely of the frame and transversely of their individual axes and at least two of said pads being adjustable relative to the frame in a direction toward and away from the planar gauging surface of the first member to position the gauge bar with its said precision gauging face at a right angle to said planar gauging surface;

the pads being positioned with their said axes arranged relative to the frame to define on said planar gauging surface of the first member a right angle triangle of which one of the legs of the right angle is parallel to said planar gauging face of the bar and to said planar gauging surface of the first member, and the other leg of the right angle is normal to said planar gauging face of the bar and parallel to said planar gauging surface; and two of said pads being adjustable parallel to their said individual axes and being positioned at the apices of the acute angles of said right triangle, respectively, wherefore components of tilt of the frame by adjustment of one of said two adjustable pads does not change the tilted position of the frame in the direction into which the frame is tilted by the other of the two adjustable pads.

8. The structure according to claim 7 wherein said pads being positioned on the frame so that the flat slide surface areas of all of the pads are in sliding engagement concurrently with said planar surface and are coplanar with respect to each other when in said engagement; and each surface area of each pad is interrupted about its entire periphery by a portion of said remainder of said end face which portion extends about said entire periphery and is offset axially from said slide surface area so that each slide surface area is discontinuous with respect to, and is isolated from, each of the other slide surface areas of the same pad.

9. The structure according to claim 7 wherein the connecting means of each pad includes complementary load transmitting surfaces on the frame and on the pad, respectively, and resilient means are carried by the frame and yieldably engage each pad and hold it with the surfaces associated with it in resilient contact with each other.

10. The structure according to claim 9 wherein the frame has threaded bores coaxial with said axes of the adjustable pads, respectively, screws are mounted in threaded engagement in said bores, respectively, and are adjustable axially for moving their associated pads outwardly from the frame in a direction axially of the associated screws against the biasing force of the resilient means.

References Cited

UNITED STATES PATENTS

| | | |
|---|---|---|
| 1,345,597 | 7/1920 | Jantsch et al. |
| 1,804,421 | 5/1931 | Klopsteg. |
| 1,855,528 | 4/1932 | Onsrud. |
| 2,253,844 | 8/1941 | Cassavant. |
| 2,469,904 | 5/1949 | Szuba. |
| 2,546,116 | 3/1951 | West et al. |
| 2,627,660 | 2/1953 | Smith. |
| 2,691,814 | 10/1954 | Tait. |
| 2,819,530 | 1/1958 | Webber. |
| 2,827,707 | 3/1958 | Croshier et al. |
| 2,859,530 | 11/1958 | Renaud. |
| 3,025,557 | 3/1962 | Knowlton _____ 248—188.3 |
| 3,047,956 | 8/1962 | German. |
| 3,143,758 | 8/1964 | Dunham. |
| 3,212,827 | 10/1965 | Brettrager. |
| 3,271,871 | 9/1966 | Foscarota. |
| 3,273,252 | 9/1966 | Bunge. |
| 3,279,079 | 10/1966 | Schiler. |
| 3,289,310 | 12/1966 | Stone. |
| 3,298,753 | 1/1967 | Eaton. |

SAMUEL S. MATTHEWS, Primary Examiner

UNITED STATES PATENT OFFICE
CERTIFICATE OF CORRECTION

Patent No. 3,460,263      Dated August 12, 1969

Inventor(s) Erwin W. Graham

It is certified that error appears in the above-identified patent and that said Letters Patent are hereby corrected as shown below:

Column 1, line 16, "second", second occurrence, should read -- first --; line 18, "second" should read -- first --. Column 8, line 4, after "gauge" insert -- bar --; line 36, "being" should read -- are --. Column 9, line 22, "being" should read -- are --.

Signed and sealed this 13th day of April 1971.

(SEAL)
Attest:

EDWARD M. FLETCHER, JR.　　　　　　　WILLIAM E. SCHUYLER, JR.
Attesting Officer　　　　　　　　　　Commissioner of Patents